(12) United States Patent
Ide (10) Patent No.: US 10,270,121 B2
(45) Date of Patent: Apr. 23, 2019

(54) SECONDARY BATTERY

(71) Applicant: NEC ENERGY DEVICES, LTD., Sagamihara-shi, Kanagawa (JP)

(72) Inventor: Keiji Ide, Kanagawa (JP)

(73) Assignee: NEC ENERGY DEVICES, LTD., Sagamihara-shi, Kanagawa (JP)

(*) Notice: Subject to any disclaimer, the term of this patent is extended or adjusted under 35 U.S.C. 154(b) by 21 days.

(21) Appl. No.: 14/908,370

(22) PCT Filed: Dec. 10, 2013

(86) PCT No.: PCT/JP2013/083137
§ 371 (c)(1),
(2) Date: Jan. 28, 2016

(87) PCT Pub. No.: WO2015/015663
PCT Pub. Date: Feb. 5, 2015

(65) Prior Publication Data
US 2016/0181650 A1 Jun. 23, 2016

(30) Foreign Application Priority Data
Jul. 31, 2013 (JP) .................................. 2013-159372

(51) Int. Cl.
*H01M 10/04* (2006.01)
*H01M 10/052* (2010.01)
(Continued)

(52) U.S. Cl.
CPC .......... *H01M 10/04* (2013.01); *H01M 2/1673* (2013.01); *H01M 2/26* (2013.01);
(Continued)

(58) Field of Classification Search
CPC ............ H01M 10/04; H01M 10/0431; H01M 10/0409; H01M 4/06; H01M 2/26;
(Continued)

(56) References Cited

U.S. PATENT DOCUMENTS

| 2004/0067417 A1 | 4/2004 | Oosawa et al. |
| 2005/0031949 A1 | 2/2005 | Maeda |
| 2011/0027636 A1 | 2/2011 | Lee et al. |

FOREIGN PATENT DOCUMENTS

| CN | 203026592 U | 6/2013 |
| JP | 7-249403 A | 9/1995 |

(Continued)

OTHER PUBLICATIONS

Machine translation of JP 2003-151535, retrieved from <https://www4.j-platpat.inpit.go.jp/eng/tokujitsu/tkbs_en/TKBS_EN_GM101_Top.action> on Mar. 28, 2016.*
Machine translation of JP 2006-147392, retrieved from <https://www.j-platpat.inpit.go.jp/web/all/top/BTmTopEnglishPage> on Jun. 15, 2018. (Year: 2006).*

(Continued)

*Primary Examiner* — Cynthia K Walls
(74) *Attorney, Agent, or Firm* — Sughrue Mion, PLLC (57) ABSTRACT

A secondary battery includes a battery electrode assembly in which positive electrode 1 and negative electrode 6 are stacked alternately with separator 20 interposed therebetween. Positive electrode 1 and negative electrode 6 each have current collector 3, 8 and active material 2, 7. Each surface of current collectors 3, 8 has a coated portion and an uncoated portion of active materials 2, 8. Active material 2, 7 has inclined portions 2a, 7a having decreasing thickness. Insulators 40 are arranged to cover boundaries 4a between the coated portion and the uncoated portion of positive electrode 1. One or both of insulators 40 on both surfaces of positive electrode current collector 3 have one end 40a which is located on inclined surface 2a and which is opposite to inclined portion 7a of one or both of active materials 7 on both surfaces of negative electrode current collector 3, and have other end 40b which is located on uncoated portion of positive electrode 1.

7 Claims, 9 Drawing Sheets

(51) Int. Cl.
*H01M 10/0585* (2010.01)
*H01M 2/16* (2006.01)
*H01M 4/13* (2010.01)
*H01M 10/0525* (2010.01)
*H01M 2/26* (2006.01)
*H01M 4/06* (2006.01)
*H01M 4/64* (2006.01)
*H01M 4/02* (2006.01)

(52) U.S. Cl.
CPC ............... *H01M 4/06* (2013.01); *H01M 4/13* (2013.01); *H01M 10/0409* (2013.01); *H01M 10/0431* (2013.01); *H01M 10/052* (2013.01); *H01M 10/0525* (2013.01); *H01M 10/0585* (2013.01); *H01M 4/64* (2013.01); *H01M 2004/028* (2013.01); *H01M 2220/20* (2013.01); *H01M 2220/30* (2013.01); *Y02E 60/122* (2013.01); *Y02T 10/7011* (2013.01)

(58) Field of Classification Search
CPC .. H01M 10/0525; H01M 2/1673; H01M 4/13; H01M 10/052; H01M 10/0585; H01M 2004/028; H01M 2220/30; H01M 4/64; H01M 2220/20
See application file for complete search history.

(56) References Cited

FOREIGN PATENT DOCUMENTS

| | | |
|---|---|---|
| JP | 10-241725 A | 9/1998 |
| JP | 2003-151535 A | 5/2003 |
| JP | 2006-147392 A | 6/2006 |
| JP | 2008-159330 A | 7/2008 |
| JP | 2010-103089 A | 5/2010 |
| JP | 2012-164470 A | 8/2012 |
| WO | 2009/008160 A1 | 1/2009 |
| WO | 2011/118514 A1 | 9/2011 |
| WO | 2012/124188 A1 | 9/2011 |
| WO | 2012/081465 A1 | 6/2012 |
| WO | 2012/124186 A1 | 9/2012 |
| WO | 2013/176161 A1 | 11/2013 |

OTHER PUBLICATIONS

International Search Report for PCT/JP2013/083137 dated Feb. 10, 2014 [PCT/ISA/210].
Communication dated Mar. 1, 2017, issued from the European Patent Office in counterpart Application No. 13890551.8.
Communication dated Apr. 5, 2017, issued from the State Intellectual Property Office of People's Republic of China in counterpart Application No. 201380078610.7.
Communication dated Oct. 17, 2017 from the Japanese Patent Office in counterpart application No. 2015-529320.

* cited by examiner

SECONDARY BATTERY

CROSS REFERENCE TO RELATED APPLICATIONS

This application is a National Stage of International Application No. PCT/JP2013/083137, filed on Dec 10, 2013, which claims priority from Japanese Patent Application No. 2013-159372, filed on Jul 31, 2013, the contents of all of which are incorporated herein by reference in their entirety.

TECHNICAL FIELD

The present invention relates to a secondary battery in which a positive electrode and a negative electrode are stacked with a separator interposed between each of the electrodes.

BACKGROUND ART

Secondary batteries have come into wide use not only for power supplies of portable devices such as cellphones, digital cameras, and laptop computers, but also for domestic power supplies or vehicle power supplies. Particularly, a lithium-ion secondary battery, which has high energy density and light weight, has become an energy storage device necessary for life.

Secondary batteries are classified broadly into a rolled type and a stacked type. A battery electrode assembly in a rolled type secondary battery has a structure in which a long positive electrode sheet and a long negative electrode sheet that are separated from each other by a separator, are stacked and rolled a plurality of times. A battery electrode assembly in a stacked type secondary battery has a structure in which positive electrode sheets and negative electrode sheets are stacked alternately and repeatedly with separators interposed therebetween. Each of the positive electrode sheets and the negative electrode sheets includes a current collector having a coated portion to which active material (which may be a composite material including a binding agent, a conductive material or the like) is applied and an uncoated portion to which no active material is applied in order to connect with an electrode terminal.

In either a rolled type secondary battery or a stacked type secondary battery, a battery electrode assembly is sealed in an exterior container (an exterior case) such that one end of a positive electrode terminal is electrically connected to an uncoated portion of a positive electrode sheet and the other end extends to the outside of the exterior container, one end of a negative electrode terminal is electrically connected to an uncoated portion of a negative electrode sheet and the other end extends to the outside of the exterior container. Electrolyte is also sealed in the exterior container. The trend in secondary batteries is towards capacity increases. Increased battery capacities involve an increase in heat generation if cases when a short circuit occurs and this may significantly raise the danger threshold. Therefore, the adoption of appropriate safety measures has become increasingly important.

One example of a safety measure is a technique of forming an insulator at a boundary between a coated portion and an uncoated portion in order to prevent a short circuit between a positive electrode and a negative electrode (Patent Document 1).

RELATED ART DOCUMENT

Patent Document

Patent Document 1: JP2012-164470A

SUMMARY OF INVENTION

Problem to be Solved by the Invention

Figure 18:
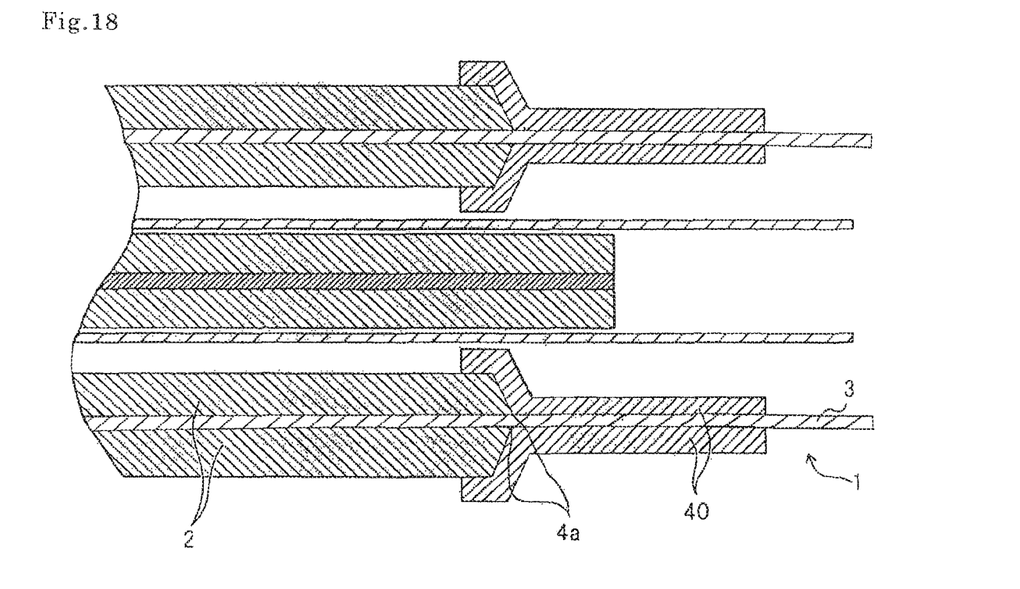
FIG. 18 is an enlarged sectional view of main parts of a laminated type secondary battery of a related art.

In the technique disclosed in Patent Document 1, as illustrated in FIG. 18, insulator 40 that covers boundary 4a between a coated portion to which active material 2 is applied and an uncoated portion to which active material 2 is not applied, is formed on current collector 3 of positive electrode 1. In a stacked type secondary battery, insulators 40 are repeatedly stacked at the same position in a plane view. Consequently, there is a large increase in the thickness of a battery electrode assembly at those positions where insulators 40 are arranged, thereby lowering energy density per unit volume.

To stabilize electrical characteristics and reliability of a secondary battery, it is preferable that a tape or the like be used to adhere the battery electrode assembly and that uniform pressure be applied. However, when the insulator disclosed in Patent Document 1 is used in a stacked type secondary battery, uniform pressure cannot be applied to the battery electrode assembly due to the difference in thickness between the portion where insulator 40 is present and the portion where insulator 40 is not present. Thereby, the degradation in quality of the battery such as fluctuation of electrical characteristics and degradation in cycle characteristics may be caused.

Therefore, an object of the preset invention is to provide a high quality secondary battery in which an insulator is used to prevent a short circuit between a positive electrode and a negative electrode and in which an increase in volume and deformation of the battery electrode assembly is reduced, thereby realizing a battery having high electrical properties and high reliability and thus solving the above mentioned problems.

Means to Solve the Problem

A secondary battery of the present invention comprises a battery electrode assembly in which a positive electrode and a negative electrode are stacked alternately with a separator interposed therebetween. The positive electrode and the negative electrode each have a current collector, and active material that is applied on the current collector. Each surface of the current collector has a coated portion to which the active material is applied and an uncoated portion to which active material is not applied. The active material has an inclined portion or stepped portion having a decreasing thickness on at least a part of the outer edge of the coated portion. Insulators are arranged to cover boundaries between the coated portion and the uncoated portion of the positive electrode. One or both of the insulators provided on the current collector of the positive electrode have one end which is located on the inclined surface or stepped portion of the active material of the positive electrode and which is opposite to the inclined portion or stepped portion of one or both of the active materials formed on both surfaces of the current collector of the negative electrode, and have the other end which is located on the uncoated portion of the positive electrode.

Effect of Invention

According to a secondary battery of the present invention, an increase in the volume of a battery electrode assembly and deformation of a battery electrode assembly caused by an insulator can be reduced. Therefore, a secondary battery having excellent energy density and high quality can be provided.

BRIEF DESCRIPTION OF DRAWINGS

FIG. 6b is a plan view of a positive electrode that is formed by being cut in the step illustrated in FIG. 6a.

FIG. 8b is a plan view of a negative electrode that is formed by being cut in the step illustrated in FIG. 8a.

FIG. 10b is an enlarged sectional view taken along line A-A in FIG. 10a.

FIG. 16b is a plan view illustrating a positive electrode that is formed by being cut in the step illustrated in FIG. 16a.

DESCRIPTION OF EXEMPLARY EMBODIMENTS

Hereinafter, an exemplary embodiment of the present invention will be described with reference to the drawings.

Figure 1:
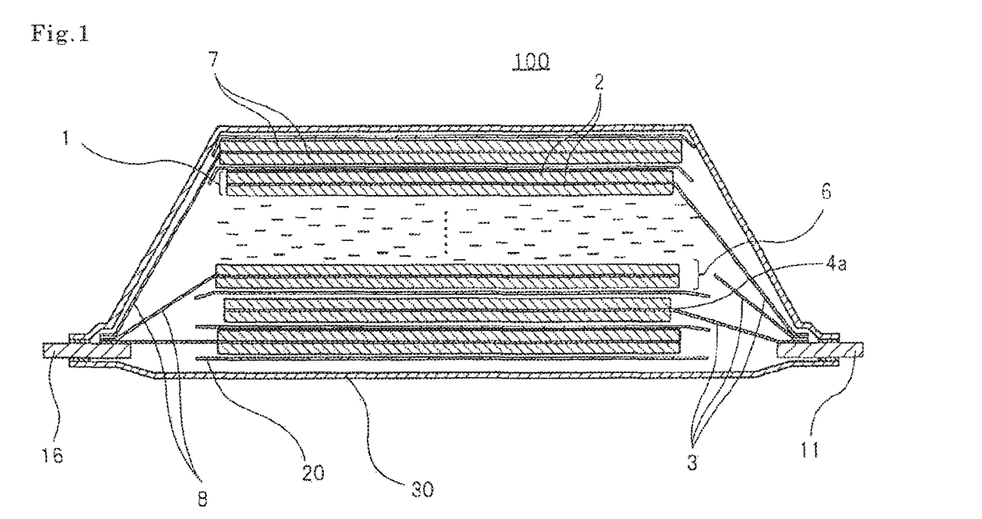
FIG. 1 is a schematic sectional view of a basic structure of a stacked type secondary battery of the present invention.

FIG. 1 schematically illustrates an example of a configuration of a stacked type lithium-ion secondary battery that is made according to the present invention. Lithium-ion secondary battery 100 of the present invention includes a laminated electrode assembly (a battery electrode assembly) in which a plurality of positive electrodes (positive electrode sheets) 1 and negative electrodes (negative electrode sheets) 6 are stacked alternately with separators 20 interposed therebetween. The laminated electrode assembly and an electrolyte are contained in an exterior container formed of flexible film 30. One end of positive electrode terminal 11 and one end of negative electrode terminal 16 are connected to positive electrode 1 and negative electrode 6 of the laminated electrode assembly, respectively. The other end of positive electrode terminal 11 and the other end of negative electrode terminal 16 each extend to the outside of flexible film 30. In FIG. 1, an illustration of a part (layers at an intermediate portion in the thickness direction) of the layers constituting the laminated electrode assembly is omitted but the electrolyte is illustrated.

Positive electrode 1 includes positive electrode current collector 3 and positive electrode active material 2 applied on positive electrode current collector 3. A coated portion to which positive electrode active material 2 is applied and an uncoated portion to which positive electrode active material 2 is not applied, are arranged side by side in a longitudinal direction on each of the front and rear surfaces of positive electrode current collector 3. Similarly, negative electrode 6 includes negative electrode current collector 8 and negative electrode active material 7 applied on negative electrode current collector 8. A coated portion and an uncoated portion are arranged side by side in a longitudinal direction on each of the front and rear surfaces of negative electrode current collector 8. An end of a coated portion (positive electrode active material 2) at the boundary between the coated portion and an uncoated portion may be slightly inclined or may be substantially perpendicular to positive electrode current collector 3. In negative electrode 6, similarly, an end of a coated portion (negative electrode active material 8) may be slightly inclined or may be substantially perpendicular to negative electrode current collector 7.

Uncoated portions of positive electrode 1 and negative electrode 6 are used as tabs to be connected to the respective electrode terminals (positive electrode terminal 11 and negative electrode terminal 16). The positive electrode tabs of positive electrodes 1 are arranged on positive electrode terminal 11 and are connected to positive electrode terminal 11 by ultrasonic welding or the like. The negative electrode tabs of negative electrodes 6 are arranged on negative electrode terminal 16 and are connected to negative electrode terminal 16 by ultrasonic welding or the like. Subsequently, the other end of positive electrode terminal 11 and the other end of negative electrode terminal 16 each extend to the outside of the exterior container.

Figure 2:
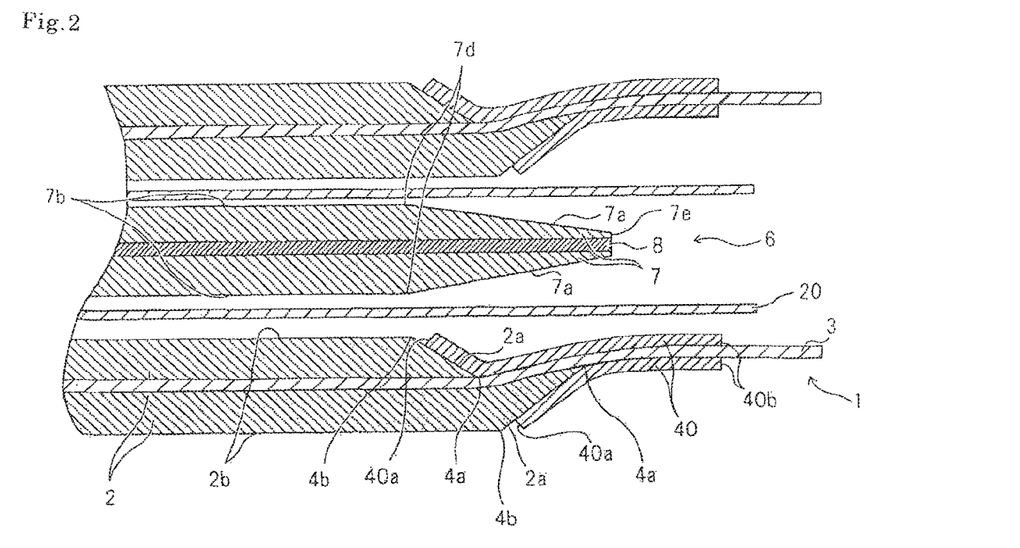
FIG. 2 is an enlarged sectional view of a main part of a secondary battery in an exemplary embodiment of the present invention.

As illustrated in FIG. 2, insulator 40 whose purpose is to prevent a short circuit with negative electrode terminal 16 is formed such that insulator 40 covers boundary 4a between the coated portion and the uncoated portion of positive electrode 1. To cover boundary 4a, insulator 40 is preferably formed to lie over both the positive electrode tab (a part of the positive electrode current collector that is not coated with positive electrode active material 2) and positive electrode active material 2. Forming of insulator 40 will be described later.

The dimension of exterior contour of a coated portion (negative electrode active material 7) of negative electrode 6 is larger than that of a coated portion (positive electrode active material 2) of positive electrode 1 and smaller than that of separator 20.

In the battery illustrated in FIG. 1, examples of positive electrode active material 2 include layered oxide-based materials such as $LiCoO_2$, $LiNiO_2$, $LiNi_{1-x}CoO_2$, $LiNi_x(CoAl)_{(1-x)}O_2$, $Li_2MO_3$—$LiMO_2$, $LiNi_{1/3}Co_{1/3}Mn_{1/3}O_2$, spinel-based materials such as $LiMn_2O_4$, $LiMn_{1.5}Ni_{0.5}O_4$, $LiMn_{(2-x)}M_xO_4$, olivine-based materials such as $LiMPO_4$, olivine fluoride-based materials such as $Li_2MPO_4F$, $Li_2MSiO_4F$, and vanadium oxide-based materials such as $V_2O_5$. One of the above materials or a mixture of two or more selected from among the above materials may be used as positive electrode active material 2.

As negative electrode active material 7, carbon materials such as graphite, amorphous carbon, diamond-like carbon, fullerene, carbon nanotubes or carbon nanohorns, lithium metal materials, silicon- or tin-based alloy materials, oxide-based materials such as $Nb_2O_5$ or $TiO_2$, or a composite of them can be used.

A binding agent or a conductive assistant may be added to positive electrode active material 2 and negative electrode active material 7 as appropriate. As the conductive assistant, carbon black or carbon fiber or graphite or the like can be used and the combination of two or more of the above materials can be used. As the biding agent, polyvinylidene fluoride, polytetrafluoroethylene, carboxymethyl cellulose, modified acrylonitrile rubber particles, or the like can be used.

As positive electrode current collector 3, aluminum, stainless steel, nickel, titanium, or alloys thereof can be used, and particularly, aluminum is preferable. As negative electrode current collector 8, copper, stainless steel, nickel, titanium, or alloys thereof can be used.

As the electrolyte, one organic solvent selected from among cyclic carbonate such as ethylene carbonate, propylene carbonate, vinylene carbonate, and buthylene carbonate, chain carbonate such as ethyl methyl carbonate (EMC), diethyl carbonate (DEC), dimethyl carbonate (DMC), and dipropyl carbonate (DPC), aliphatic carboxylic acid ester, γ-lactone such as γ-butyrolactone, chain ether, and cyclic ether can be used and the mixture of two or more of the above materials can be used. Further, lithium salt may be dissolved in the organic solvents.

Separator 20 is formed mainly of a porous membrane, woven fabric, nonwoven fabric that are made of resin. As the resin component in separator 20, polyolefin-based resin such as polypropylene or polyethylene, polyester resin, acrylic resin, styrene resin, nylon resin or the like can be used, for example. A polyolefin-based microporous membrane is particularly preferable because the polyolefin-based microporous membrane has excellent ion-permeating properties and excellent performance characteristics for physically separating a positive electrode and a negative electrode. A layer containing inorganic particles may be formed in separator 20 as needed. Examples of the inorganic particles include insulating oxide, silicate, nitride, and carbide. In particular, the inorganic particles preferably contain $TiO_2$ or $Al_2O_3$.

As the exterior container, a case made of flexible film 30 or a can case can be used. From the point of view of battery weight reduction, using flexible film 30 is preferable. As flexible film 30, a film in which resin layers are provided on both the front and rear surfaces of a metal layer as a base material can be used. As the metal layer, a layer having barrier properties which may be properties for preventing leakage of an electrolyte and infiltration of moisture from the outside can be selected, and aluminum, stainless steel or the like can be used. A thermally-fusible resin layer such as modified polyolefin is provided on at least one surface of the metal layer. The thermally-fusible resin layers of flexible film 30 are opposite to each other and are thermally fused to each other in the part that surrounds the space where the laminated electrode assembly is stored, thereby the exterior container is formed. A resin layer such as a nylon film and a polyester film may be provided on the surface of the exterior container opposite to the surface on which the thermally-fusible resin layer is formed.

As positive electrode terminal 11, a terminal formed of aluminum or aluminum alloy can be used. As negative electrode terminal 16, a terminal formed of copper, copper alloy, or nickel-plated copper or copper alloy can be used. Each of the other ends of terminals 11 and 16 extends to the outside of the exterior container. Thermally-fusible resin can be provided in advance at each of the positions of terminals 11 and 16 corresponding to the thermal-welded portions of the outer peripheral of the exterior container.

Insulator 40 that is formed to cover boundary 4a between a coated portion and an uncoated portion of positive electrode active material 2 can be made of polyimide, glass fiber, polyester, polypropylene, or a material including these. Insulator 40 may be formed by applying heat to a tape-like resin member to weld the resin member to boundary 4a or by applying a gel resin to boundary 4a and drying the resin.

FIG. 2 is a schematic sectional view explaining an exemplary embodiment of the lithium-ion secondary battery of the present invention. FIG. 2 schematically illustrates only a part of a laminated electrode assembly in an enlarged manner.

On each of the front and rear surfaces of positive electrode current collector 3, the outer edge (an end adjacent to an uncoated portion), the illustration of which is omitted in FIG. 1, of a coated portion of positive electrode active material 2 is inclined portion 2a where the layer thickness of positive electrode active material 2 decreases continuously and gradually from flat portion 2b. One end (an end located on the layer of positive electrode active material 2) 40a of insulator 40 is located on inclined portion 2a.

As illustrated in FIG. 2, in the present exemplary embodiment, at least a part of a coated portion of positive electrode active material 2 in positive electrode 1 is a one-side coated portion that is coated only to one side (the lower surface in FIG. 2) to which positive electrode active material 2 is applied. In other words, boundary 4a between the coated portion and the uncoated portion of positive electrode active material 2 on the front surface of positive electrode current collector 3 is located at a plane position different from that on the rear surface, and a double-side coated portion, a one-side coated portion, and a double-side uncoated portion are arranged in this order from a center portion (the left side in FIG. 2) toward the outer peripheral portion of the laminated electrode assembly.

Similarly, on each of the front and rear surfaces of negative electrode current collector 8, the outer edge (an end adjacent to an uncoated portion) of a coated portion of negative electrode active material 7 is inclined portion 7a on which the thickness of the layer of negative electrode active material 7 gradually decreases continuously from flat portion 7b. One end 40a of insulator 40 located on positive electrode active material 2 is opposite to inclined portion 7a of negative electrode active material 7, while being located on inclined portion 2a of positive electrode active material 2 as described above. That is, one end 40a of insulator 40 is located at a position that overlaps inclined portion 2a of positive electrode active material 2 and inclined portion 7a of negative electrode active material 7 in a plane view. This means that end 40a of insulator 40 is located at a position at which the thicknesses of positive electrode active material 2 and negative electrode active material 7 are small. The thicknesses of positive electrode active material 2 and negative electrode active material 7 decrease toward other end 40b of insulator 40 and finally a portion without positive electrode active material 2 or negative electrode active material 7 is reached. Therefore, insulator 40 does not overlap with portions at which the thicknesses of positive electrode active material 2 and negative electrode active material 7 are largest. Insulator 40 prevents the thickness of a laminated electrode assembly from increasing. In particular, when ends 40a of insulators 40 are located at portions of inclined surfaces 2a and 7a of positive electrode active material 2 and negative electrode active material 7 at which the thickness decrease of positive electrode active material 2 and negative electrode active material 7 is equal to or more than the thicknesses of insulators 40, respectively, as illustrated in FIG. 2, the thickness increase that is due to insulators 40 is absorbed (canceled) by the thickness decrease of positive electrode active material 2 and negative electrode active material 7. Thus, a significant effect in which an increase in thickness is reduced, is provided.

Figure 3:
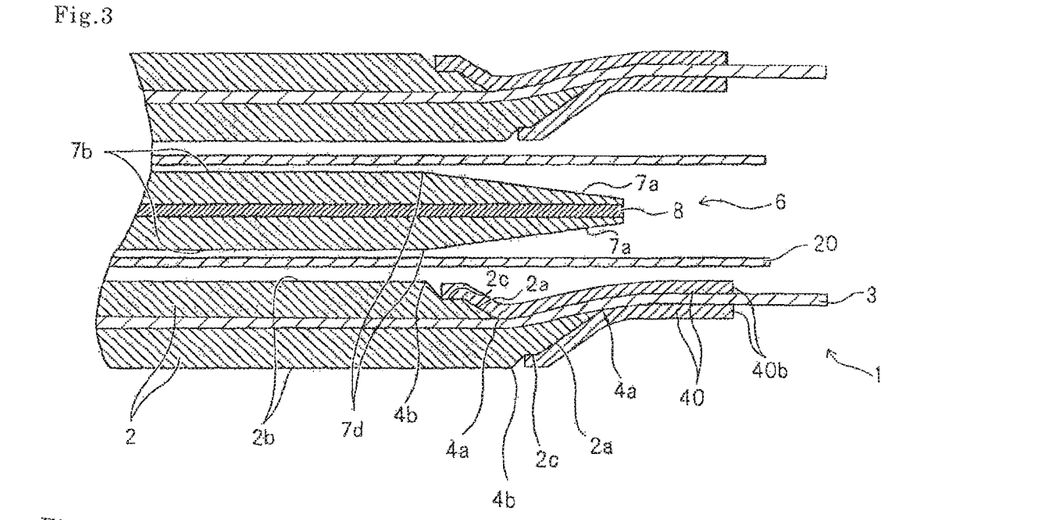
FIG. 3 is an enlarged sectional view of a modification of the secondary battery illustrated in FIG. 2.

Even when positive electrode active material 2 has stepped portion 2c, whose thickness decreases stepwise as illustrated in FIG. 3, instead of inclined surface 2a that is gently inclined as illustrated in FIG. 2, effects which are identical to the above effects can be provided as long as insulator 40 is arranged at a portion where the thickness of positive electrode active material 2 becomes small due to stepped portion 2c. Similarly, negative electrode active material 7 may have a stepped portion. In the example illustrated in FIG. 3, both gently inclined surface 2a and stepped portion 2c are provided. However, only stepped portion 2c may be provided, or a plurality of stepped portions 2c may be formed in a stair-like shape.

Each of inclined portion 2a illustrated in FIGS. 2 and 3 and stepped portion 2c illustrated in FIG. 3 has a lower density than flat portion 2b.

Figure 4:
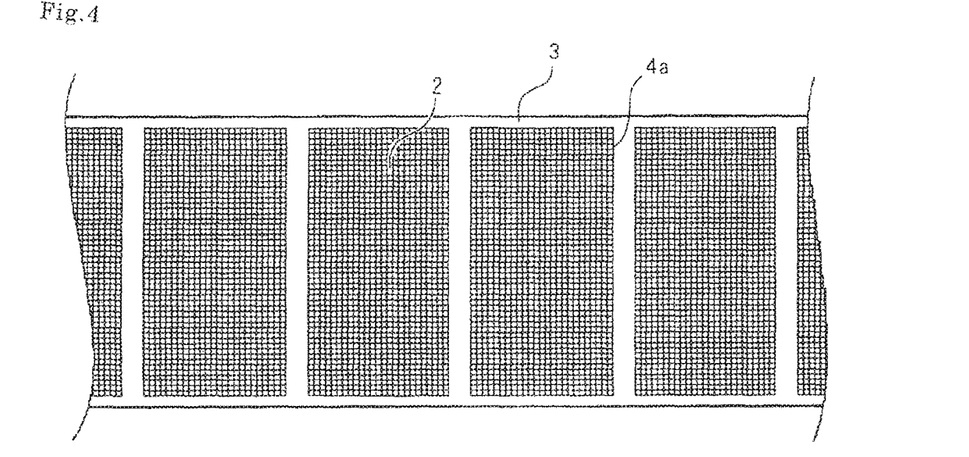
FIG. 4 is a plan view of a step of forming a positive electrode in a manufacturing method of the secondary battery of the present invention.
Figure 5:
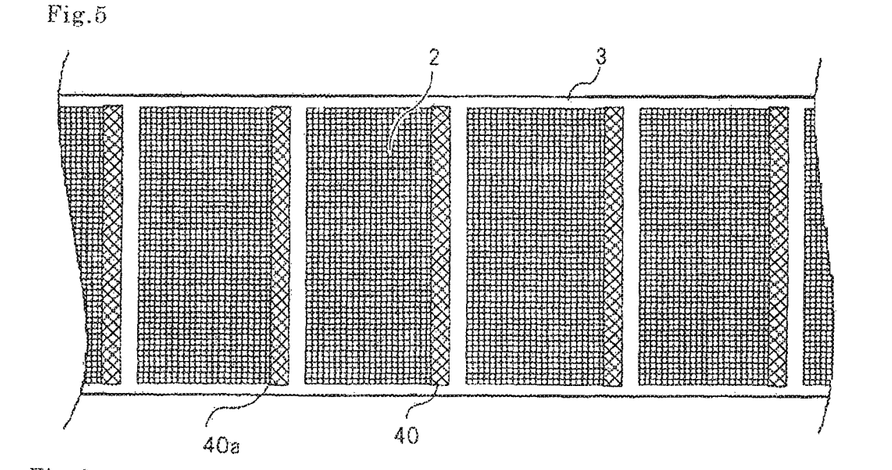
FIG. 5 is a plan view of a step following FIG. 4 in the manufacturing method of the secondary battery of the present invention.

FIGS. 4 and 5 are schematic diagrams illustrating the state in which electrodes are manufactured to simplify the positional relation among positive electrode 1, negative electrode 6, separator 20, and insulator 40 of the stacked type battery (a laminated battery) illustrated in FIGS. 1 and 2.

FIG. 4 illustrates a state in which positive electrode active material 2 is intermittently applied on a front surface of large positive current collector 3 for manufacturing a plurality of positive electrodes (positive electrode sheets) 1. Inclined portion 2a (see FIG. 2) the thickness of which gradually decreases to the outside is formed in at least a part (more specifically, an outer edge at a side to be connected to positive electrode terminal 11 later) of the outer edge of positive electrode active material 2. As illustrated in FIG. 5, insulator 40 is formed on the front surface of each positive electrode active material 2 such that one end 40a may be located on each inclined portion 2a and other end 40b is located on each uncoated portion to which positive electrode active material 2 is not applied. Similarly, positive electrode active material 2 is intermittently applied also to the rear surface of positive current collector 3, and inclined portion 2a whose thickness gradually decreases to the outside is formed in at least a part (an outer edge at a side to be connected to positive electrode terminal 11) of the outer edge of each positive electrode active material 2. Insulators 40 are formed such that one end 40a is located on each inclined portion 2a and the other end 40b is located on each uncoated portion. As illustrated in FIG. 2, boundary 4a between the coated portion and the uncoated portion on the front surface of positive electrode active material 2 and boundary 4a between the coated portion and the uncoated portion on the rear surface of positive electrode active material 2 are located at different positions in a plane view. That is, the position of boundary 4a between the coated portion and the uncoated portion on the front surface of positive electrode active material 2 is deviated from that on the rear surface.

When the thickness of insulator 40 is too small, the insulating properties may be insufficient. Thus, the thickness of insulator 40 is preferably 10 μm or more. When the thickness of insulator 40 is excessively large, an effect of preventing an increase in the thickness of the laminated electrode assembly in the present invention is not sufficiently provided. Thus, insulator 40 is preferably smaller than the thickness of flat portion 2b of positive electrode active material 2. The thickness of insulator 40 is preferably 90% of the thickness of flat portion 2b of positive electrode active material 2 or less, and more preferably 60% of the thickness of flat portion 2b or less.

Figure 6A:
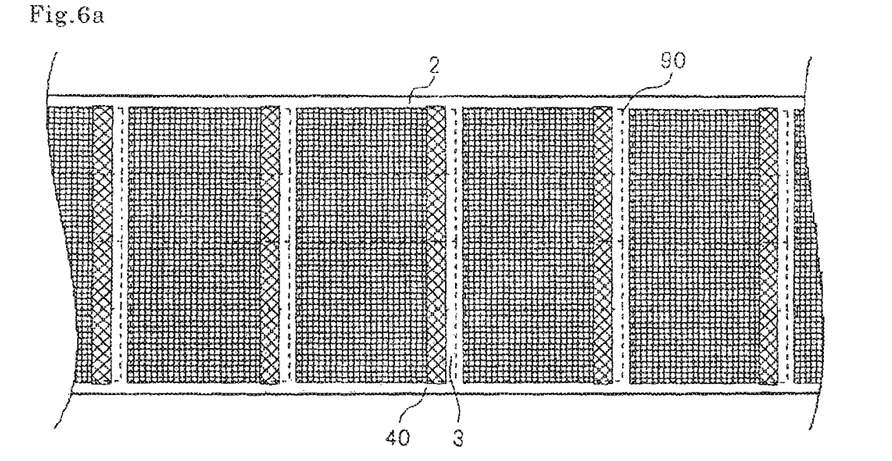
FIG. 6a is a plan view of a step following FIG. 5 in the manufacturing method of the secondary battery of the present invention.
Figure 6B:
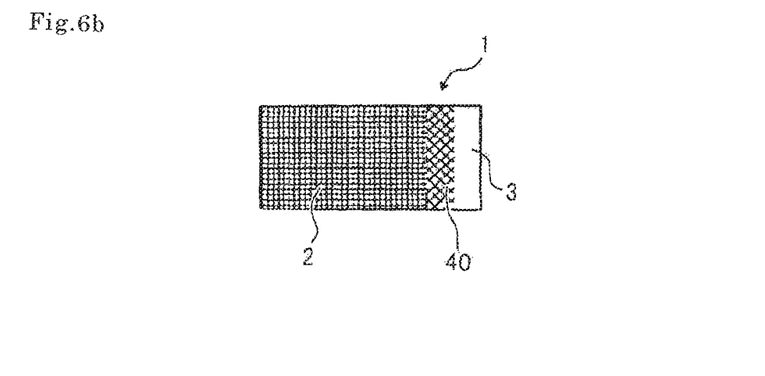

Thereafter, to obtain positive electrodes 1 to be used for stacked type batteries, positive electrode current collector 3 is cut and divided along cut lines 90 shown by broken lines in FIG. 6a and positive electrodes 1 each having a desired size illustrated in FIG. 6b are obtained. Cut lines 90 are virtual lines and are not actually formed.

Figure 7:
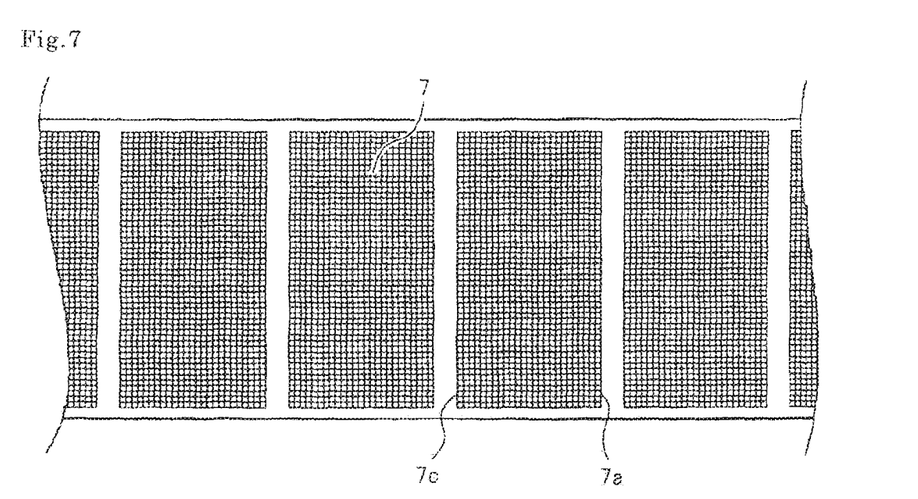
FIG. 7 is a plan view of a step of forming a negative electrode in the manufacturing method of the secondary battery of the present invention.

FIG. 7 illustrates a state where negative electrode active material 7 is intermittently applied to the front surface of large negative electrode current collector 8 for manufacturing a plurality of negative electrodes (negative electrode sheets) 6. Inclined portion 7a whose thickness gradually decreases to the outside is formed in at least a part (more specifically, an outer edge at a side to be connected to negative electrode terminal 16 later) of the outer edge of each negative electrode active material 7. Inclined portion 7c may be provided at an outer edge at a side opposite to inclined portion 7a but inclined portion 7c may not be provided. Insulator 40 is not formed on negative electrode current collector 8 and negative electrode active materials 7. As illustrated in FIG. 2, negative electrode active materials 7 are formed on both the front and rear surfaces of negative electrode current collector 8 in a similar manner. An uncoated portion on which negative electrode active material 7 is not formed is provided at the outer edge of negative electrode 6 opposite to inclined portion 7a. The uncoated portion serves as a negative tab to be connected to negative electrode terminal 16 but illustration thereof is omitted in FIGS. 2, 3 and the like.

Figure 8A:
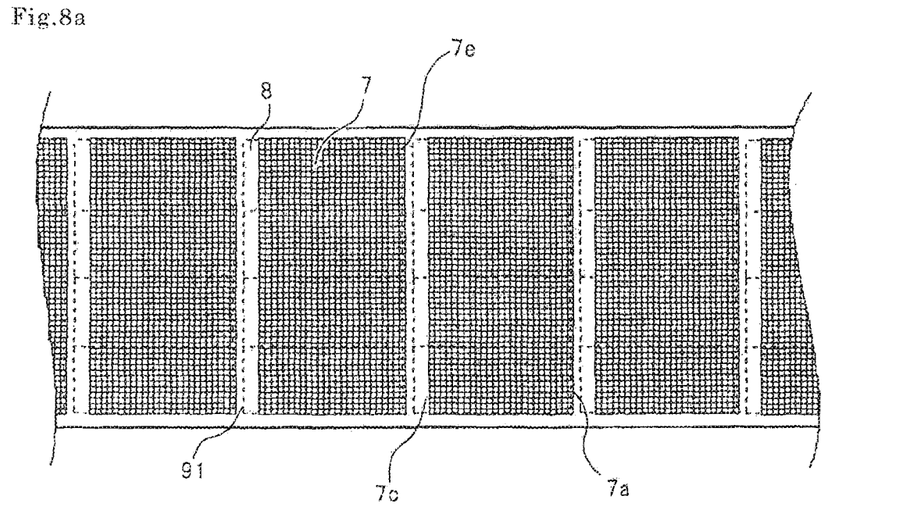
FIG. 8a is a plan view of a step following FIG. 7 in the manufacturing method of the secondary battery of the present invention.
Figure 8B:
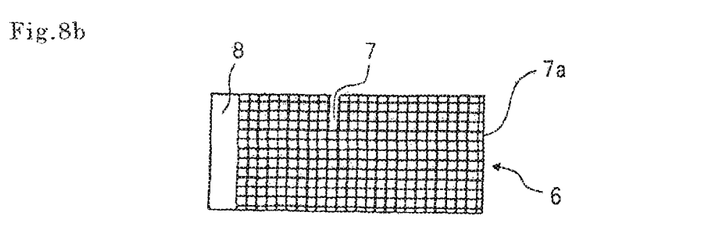

Thereafter, to obtain negative electrodes 6 to be used for stacked type batteries, negative current collector 8 is cut and divided along cut lines 91 shown by broken lines in FIG. 8a and negative electrodes 6 each having a desired size illustrated in FIG. 8b are obtained. Cut lines 90 are virtual lines and are not actually formed.

Positive electrodes 1 illustrated in FIG. 6b and negative electrode 6 illustrated in FIG. 8b that are formed in the above manner are stacked alternately with separators 20 interposed therebetween, and are connected to positive electrode terminal 11 and negative electrode terminal 16, respectively. Accordingly, the laminated electrode assembly illustrated in FIG. 2 is formed. Alternatively, the laminated electrode assembly illustrated in FIG. 3 may be formed by forming positive electrode active material 2 so as to provide stepped portion 2c to inclined portion 2a and by performing the other steps that are identical to those in the above description.

The laminated electrode assembly and electrolyte are contained and sealed in an exterior container formed of flexible film 30. Thereby, secondary battery 100 illustrated in FIG. 1 is formed. In secondary battery 100 of the present invention formed in the above manner, one end 40a of insulator 40 is located on inclined surface portion 2a (stepped portion 2c in some cases) of positive electrode active material 2 and is opposite to inclined portion 7a of negative electrode active material 7.

According to secondary battery 100, the increase in thickness that is caused by insulator 40 being formed so as to cover boundary 4a between a coated portion and an uncoated portion of positive electrode 1 is absorbed (canceled) by the decrease in thickness of inclined portion 2a (stepped portion 2c in some cases) of positive electrode active material 2 and by the decrease in thickness of inclined portion 7a of negative electrode active material 7 so that laminated electrode assembly does not have a part having increased thickness due to insulator 40. Thus, the laminated electrode assembly can be held while uniform pressure is applied. For this reason, a degradation in quality such as fluctuation of electrical characteristics and degradation in cycle characteristics can be reduced.

One end 40a of insulator 40 is preferably located at a portion such that total thickness of positive electrode active material 2 at the position at which end 40a is located and the thickness of insulator 40, is less than the thickness of a portion (flat portion 2b) other than inclined portion 2a of positive electrode active material 2. In this way, in one positive electrode 1, the thickness can be made smaller than that in a conventional configuration by approximately two times the thickness of insulator 40.

To thin a battery effectively, the total of the thickness of insulator 40, the thickness of positive electrode active material 2 at a position of end 40a of insulator 40, the thickness of negative electrode active material 7 at a position opposite to end 40a of insulator 40 is preferably smaller than the total of the thickness of flat portion 2b of positive electrode active material 2 and the thickness of flat portion 7b of negative electrode active material 7.

The possibility that insulator 40 that is provided in positive electrode 1 generates distortion of a battery can be reduced further by also forming inclined portion 7a on negative electrode 6. Insulator 40 having one end 40a located on inclined portion 2a of positive electrode active material 2 is preferably formed in such a way that the total of the thickness of insulator 40 and the thickness of positive electrode active material 2 at a position of end 40a is not larger than the thickness of flat portion 2b of positive electrode active material 2. However, even when the total thickness is larger than the thickness of flat portion 2b due to variations in manufacturing, the thickness decrease in inclined portion 7a of negative electrode active material 7 can absorb (cancel) thickness increase caused by variations in manufacturing of positive electrodes 1.

Positive electrode active material 2 is gently curved in a one-side coated portion of positive electrode 1 as illustrated in FIG. 2, so that thickness increase by insulator 40 is prevented and the positive electrode 1 is made smooth. Thus, boundary 4a on the rear surface is preferably deviated from boundary 4a on the front surface to the side of the one-side coated portion. The deviation amount is preferably five or more times larger than the thickness of insulator 40, and more preferably ten or more times larger than the thickness of insulator 40.

As illustrated in FIG. 2, transition position 7d between flat portion 7b and inclined portion 7a of negative electrode active material 7 is located closer to the center portion (the left side in FIG. 2) than end 40a of insulator 40 on inclined portion 2a of positive electrode active material 2 on the front surface of positive electrode current collector 3, that is, closer to flat portion 2b of positive electrode active material 2. In a certain portion, transition position 4d between flat portion 2b and inclined portion 2a of positive electrode active material 2 on the front surface substantially matches transition position 7d between flat portion 7b and inclined portion 7a of negative electrode active material 7 in a plane view with separator 20 interposed therebetween.

In the example illustrated in FIG. 8b, a double-side coated portion of negative electrode 6 is cut and terminated (terminal portion 7e) at a position opposite to double-side uncoated portion (a positive tab) of positive electrode 1, negative electrode active materials 8 are present on the front and rear surfaces of negative electrode current collector 8 as illustrated in FIG. 2, and there is no one-side coated portion or double-side coated portion.

However, negative electrode 6 may have a double-side uncoated portion at a position opposite to a double-side uncoated portion (a positive tab) of positive electrode 1. In this case, the plane position of a boundary between a coated portion and an uncoated portion on the front surface of negative electrode current collector 7 may not be deviated from that on the rear surface. However, similarly to positive electrode 1, the plane positions of boundaries on the front and rear surfaces of negative electrode current collector 7 may be deviated from each other and insulator 40 may be provided, as needed. In this case, end 40a of insulator 40 is preferably located on inclined surface 7a. That is, a configuration in which a boundary between a coated portion and an uncoated portion on the front surface of negative electrode current collector 8 is separated from that on the rear surface in a plane view, in other words, a double-side coated portion, a one-side coated portion, and a double-side uncoated portion are arranged side by side in a longitudinal direction and a configuration in which an insulator is provided at a boundary may be applied only to positive electrode 1, and may also be applied only to negative electrode 6, and may also be applied to both positive electrode 1 and negative electrode 6.

Unless otherwise stated, the value of the thickness of a component or the distance between components in the present invention indicates the average value of values measured at three or more arbitrary points.

The positions of flat portions 2b and 7b and inclined portions 2a and 7a of positive electrode active material 2 and negative electrode active material 7, respectively, are not limited to those in the configurations illustrated in FIGS. 2 and 3, and various modifications can be made. Some of the modifications are described in the following examples.

EXAMPLES

Example 1

A lithium-ion secondary battery was manufactured according to the manufacturing method that has been described with reference to FIGS. 4 to 8b.

<Positive Electrode>

First, active material made of a mixture of $LiMn_2O_4$ and $LiNi_{0.8}Co_{0.1}Al_{0.1}O_2$ was prepared as a positive electrode active material, carbon black was prepared as a conductive agent, PVdF was prepared as a binder. A mixture agent comprising the positive electrode active material, the conductive agent, and the binder, was dispersed in an organic solvent to prepare slurry. The slurry was applied intermittently on one surface of positive electrode current collector 3 that is composed mainly of aluminum and having a thickness of 20 μm, as illustrated in FIG. 4, and dried, thereby forming positive electrode active material 2 having a thickness of 80 μm. By intermittent coating with positive electrode active material 2, a coated portion and an uncoated portion of positive electrode active material 2 were arranged alternately in the longitudinal direction of positive electrode current collector 2. On the other surface of positive electrode current collector 3, positive electrode active material 2 having a thickness of 80 μm was formed in such a way that boundary 4a between the coated portion and the uncoated portion of positive electrode active material 2 was deviated inwardly by 2 mm from boundary 4a on the one surface. The coated portion of positive electrode active material 2 included flat portion 2b and inclined portion 2a. Inclined portion 2a was formed by performing coating so as to decrease the thickness of positive electrode active material 2 from flat portion 2b to the uncoated portion.

A method of coating a current collector with an active material will be described. Various devices, such as a doctor blade, a die coater, a gravure coater, or the like can be used as a device for applying active material, and such devices perform various coating methods including a transfer method and a vapor deposition method. In the present invention, to control the position of the end of the applied active material, using a die coater is particularly preferable. Coating methods that use active material by a die coater are broadly classified into two methods which are a continuous coating method in which active material is continuously formed in the longitudinal direction of a long current collector and an intermittent coating method in which coated portions and uncoated portions of active materials are arranged alternately in the longitudinal direction of a current collector.

Figure 9:
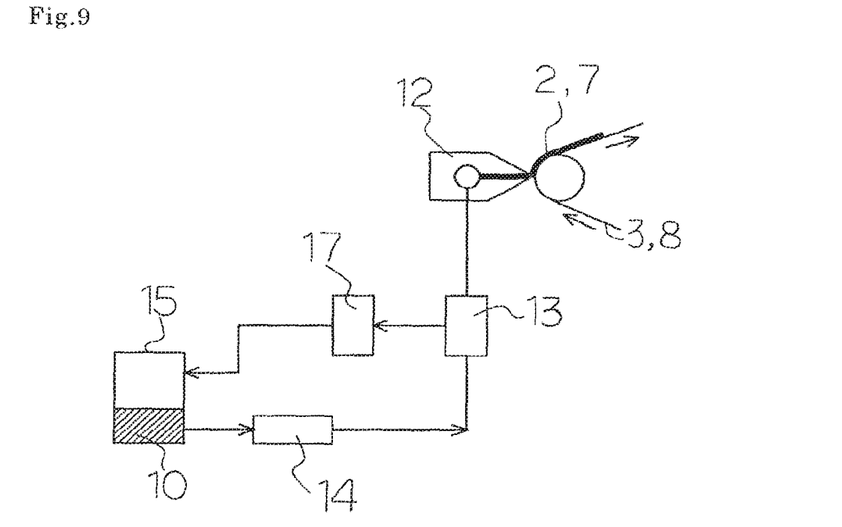
FIG. 9 is a block diagram schematically illustrating an example of a device used for intermittent coating with active material.

FIG. 9 illustrates an example of a configuration of a die coater that performs intermittent coating. As illustrated in FIG. 9, a die coater, having a passage through which slurry moves, and that performs intermittent coating, includes die head 12, coating valve 13 connected to die head 12, pump 14, and tank 15 that stores slurry 10. The slurry passage further includes return valve 17 between tank 15 and coating valve 13. In this configuration, a motor valve is preferably used at least as coating valve 13. A motor valve can switch the opening/closing state with high accuracy even when slurry is being applied. Therefore, the operations of coating valve 13 configured by a motor valve and return valve 17 are combined to control the flow of slurry or the like through the flow passage. Accordingly, a boundary between the coated portion and the uncoated portion of an active material can be formed into a desired shape.

Figure 10A:
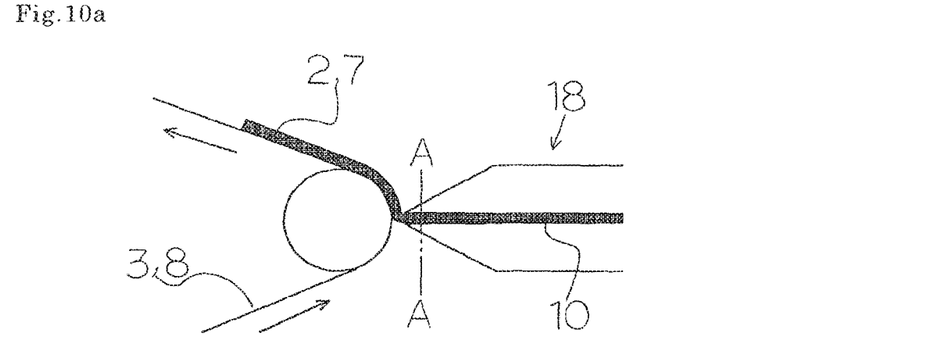
FIG. 10a is a sectional view schematically illustrating an example of a device used for continuous coating with active material.
Figure 10B:
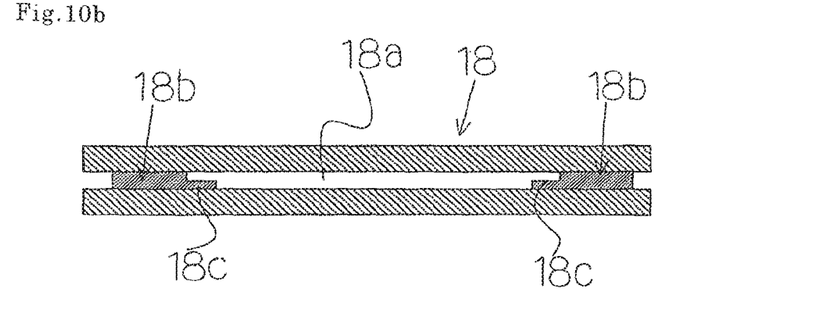

Alternatively, an active material may be formed by continuous coating with a die coater schematically illustrated in FIGS. 10a and 10b. Shims 18b each including tapered or stepped portion 18c whose thickness decreases to the center of ejecting port 18a are provided at both ends of ejecting port 18a of die head 18 of the die coater. Shims 18b allow an active material to be formed so as to generate a stepped or inclined portion at one end of the coated portion.

After positive electrode active material 2 was applied on positive electrode current collector 3 in the above method, insulating tape (insulator) 40 made of polypropylene and having a thickness of 30 μm was attached to cover boundary 4a, as illustrated in FIG. 5. At that time, insulating tape 40 covering boundary 4a between the coated portion (double-side coated portion) and the uncoated portion (one-side coated portion) on one surface of positive electrode active material 2 was formed such that end 40a was located on inclined portion 2a of positive electrode active material 2. Insulating tape 40 covering boundary 4a on the other surface of positive electrode active material 2 was attached such that end 40a was located on inclined portion 2a of positive electrode active material 2 on the other surface and insulating tape 40 covered boundary 4a on the other surface that was deviated inwardly or outwardly from boundary 4a on the one surface by 1 mm and also covered a part of positive electrode current collector 3. As illustrated in FIGS. 6a and 6b, positive electrode current collector 3 was cut along cut lines 90, and positive electrodes 1 were obtained.

<Negative Electrode>

Graphite having a surface coated with an amorphous material was prepared as negative electrode active material 7, and PVdF was prepared as a binder. A mixture agent comprising the negative electrode active material 7 and the binder was dispersed in an organic solvent to prepare slurry. The slurry was applied intermittently on a copper foil having a thickness of 15 μm, which was negative electrode current collector 8 as illustrated in FIG. 7 and dried, thereby forming a negative electrode roll including coated portions and uncoated portions of negative electrode active material 7, similarly to positive electrode 1. The specific method of coating with negative electrode active material 7 was similar to that with positive electrode active material 2 described above. The coating method may be intermittent coating using the die coater illustrated in FIG. 9 or may be continuous coating using the die coater illustrated in FIGS. 10a and 10b.

Negative electrode active material 7 was formed by applying negative electrode active material 7 such that flat portion 7b and inclined portion 7a were provided and the thickness of inclined portion 7a decreased from flat portion 7b to the outer edge. As illustrated in FIGS. 8a and 8b, negative electrode current collector 8 was cut along cut lines 91 and negative electrodes 6 were obtained. Negative electrode 6 included a negative electrode tab that is an uncoated portion of negative electrode active material 7 at a position that was not opposite to the positive electrode tab. Negative electrode current collector 8 was cut at portion 7e that was opposite to the positive electrode tab and that was provided with negative electrode active materials 7 on the both surfaces. The thickness of flat portion 7b of negative electrode active material 7 on one surface was 55 μm. An insulator was not provided at a boundary between the coated portion and the uncoated portion of negative electrode 6.

<Manufacturing of Stacked Type Battery>

The resultant positive electrode 20 and negative electrode 21 were alternately stacked one on the other with separator 20, that was formed of polypropylene and that had a thickness of 25 μm, interposed therebetween. Positive electrode terminal 11 and negative electrode terminal 16 were attached to the stacked positive electrode 20 and negative electrode 21 with separator 20 interposed therebetween, and then stacked positive electrode 20 and negative electrode 21 with separator 20 interposed therebetween were contained in an exterior container that was formed of flexible film 30. Thus, a stacked type battery having a thickness of 8 mm was obtained.

Negative electrode 6 was formed such that transition position 7d, which was a position opposite to the positive electrode tab (a double-side uncoated portion of positive electrode 1), between flat portion 7b and inclined portion 7a of negative electrode active material 7 was closer to flat portion 2b of positive electrode active material 2 than end 40a of insulating tape 40 provided on inclined portion 2a of positive electrode active material 2 on one surface of positive electrode 1. Here, transition position 4b between flat portion 2b and inclined portion 2a of positive electrode active material 2 was arranged so as to have a part which almost overlaps transition position 7d between flat portion 7b and inclined portion 7a of negative electrode active material 7 in a plane view with separator 20 interposed therebetween.

Example 2

By using a mixture agent including $LiMn_2O_4$ as an active material, carbon black as a conductive agent, and PVdF as a binder, positive electrode active material 2 having a thickness of 35 μm was formed on each surface of positive electrode current collector 3. Negative electrode active material 7 that is made of hardly (barely) graphitizable carbon and that has a thickness of 35 μm was formed on each surface of negative electrode current collector 8. The other conditions including the formation positions of active materials 2 and 7 and insulator 40 were identical to those in the example 1. Thus, a stacked type battery having a thickness of 3 mm was obtained.

Example 3

End 40a of insulator 40 on positive electrode active material 2 on positive electrode current collector 3 was deviated from terminal 4a of positive electrode active material 2 that was located on the opposite side via positive electrode current collector 3 inwardly or outwardly by 0.3 mm and the other conditions were identical to those in the example 1. Thus, a stacked battery was obtained. The thickness of the resultant stacked type battery was 8.1 mm.

Example 4

Boundary 4a between the coated portion and the uncoated portion of positive electrode active material 2 on the other surface of positive electrode current collector 3 was arranged to be deviated by 1 mm from boundary 4a on the one surface inwardly and the other conditions were identical to those in the example 3. Thus, a stacked type battery was obtained. The thickness of the resultant stacked type battery was 8.1 mm.

Example 5

Figure 11:
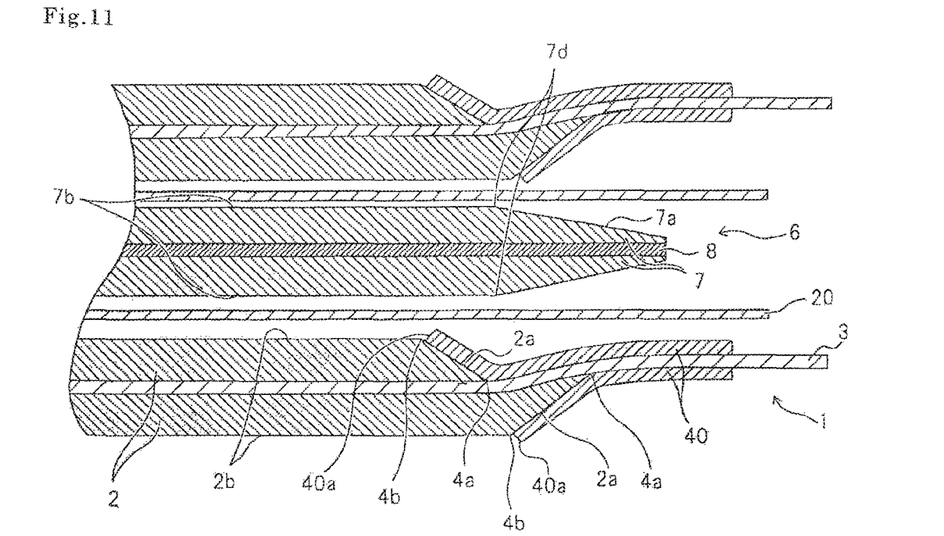
FIG. 11 is an enlarged sectional view of main parts in another exemplary embodiment of the secondary battery of the present invention.

In the present example, as illustrated in FIG. 11, the position of inclined portion 7a of negative electrode 6 differs from that in the example illustrated in FIG. 2. That is, in negative electrode 6, transition position 7d between flat portion 7b and inclined portion 7a of negative electrode active material 7, which was a position opposite to the positive electrode tab (a double-side uncoated portion of positive electrode 1), was closer to flat portion 2b than end 40a of insulating tape 40 on inclined portion 2a of positive electrode active material 2 on the other surface of positive electrode 1 and closer to inclined portion 2a than end 40a of insulating tape 40 on inclined portion 2a of positive electrode active material 2 on the one surface of positive electrode 1. The other conditions were identical to those in example 1. Thus, a stacked type battery was obtained.

Example 6

Figure 12:
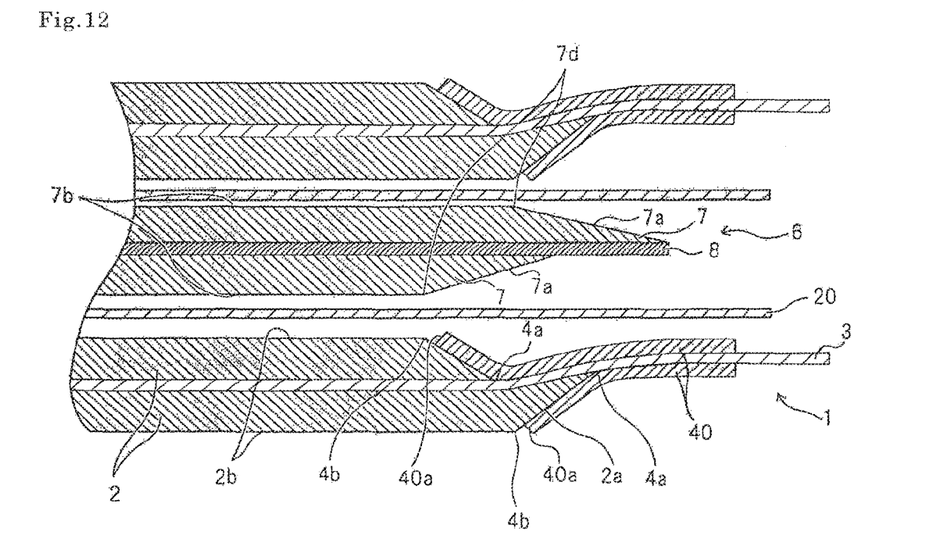
FIG. 12 is an enlarged sectional view of main parts in still another exemplary embodiment of the secondary battery of the present invention.

In the present example, as illustrated in FIG. 12, transition positions 7d between flat portions 7b and inclined portions 7a of negative electrode active materials 7 on the front and rear surfaces of negative electrode current collector 8 were different from each other. Transition positions 7d on the front and rear surfaces were arranged to respectively match transition positions 4b between flat portions 2b and inclined portions 2a of positive electrode active materials 2 directly facing the front and rear surfaces of negative electrode current collector 8 respectively in the plane view. That is, transition position 7d between flat portion 7b and inclined portion 7a of negative electrode active material 7 on the front surface of negative electrode current collector 8 matched with transition position 4b between flat portion 2b and inclined portion 2a of positive electrode active material 2 on the rear surface of positive electrode current collector 3 in the plane view. Transition position 7d between flat portion 7b and inclined portion 7a of negative electrode active material 7 on the rear surface of negative electrode current collector 8 matched transition position 4b between flat portion 2b and inclined portion 2a of positive electrode active material 2 on the front surface of positive electrode current collector 3 in the plane view. The other conditions were identical to those in example 1. Thus, a stacked type battery was obtained.

Example 7

Figure 13:
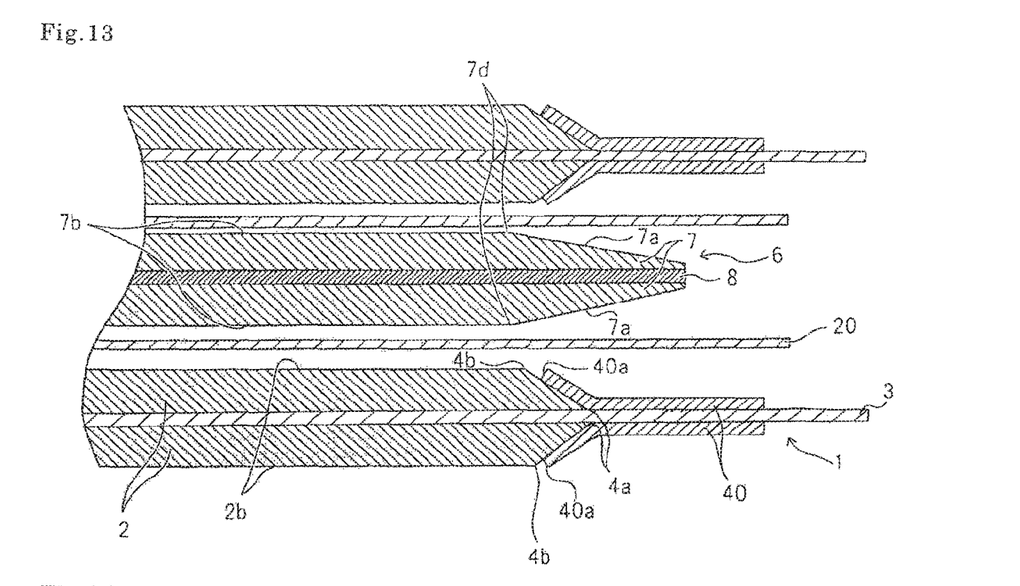
FIG. 13 is an enlarged sectional view of main parts in still another exemplary embodiment of the secondary battery of the present invention.
Figure 14:
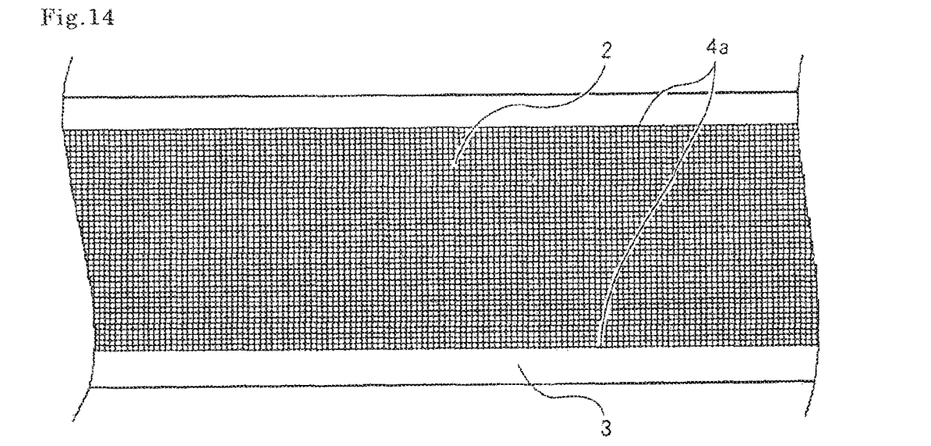
FIG. 14 is a plan view illustrating another example of the step of forming a positive electrode in the manufacturing method of the secondary battery of the present invention.
Figure 15:
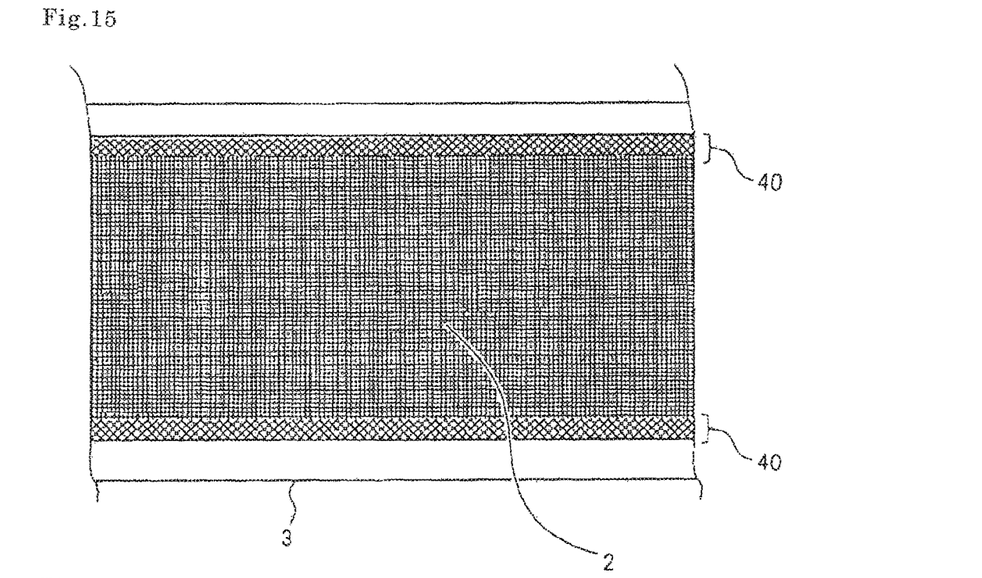
FIG. 15 is a plan view of a step following FIG. 14 in the manufacturing method of the secondary battery of the present invention.
Figure 16A:
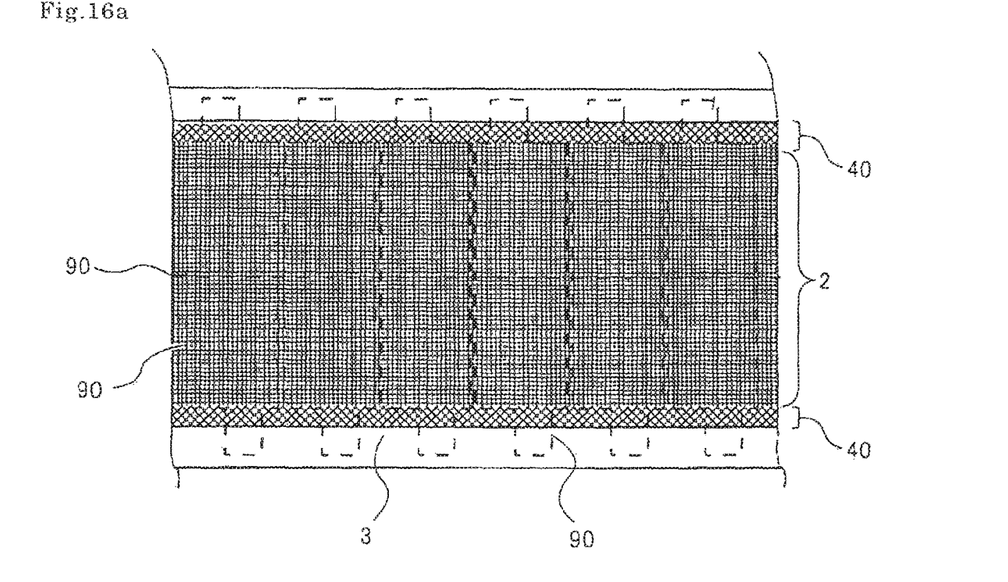
FIG. 16a is a plan view of a step following FIG. 15 in the manufacturing method of the secondary battery of the present invention.
Figure 16B:
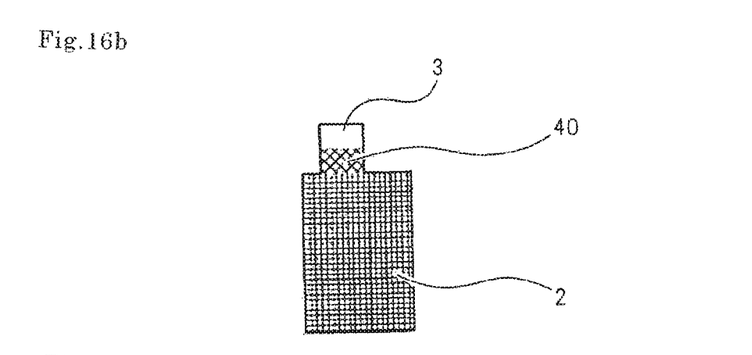

In the present example, as illustrated in FIG. 13, transition positions 7d between flat portions 7b and inclined portions 7a of negative electrode active materials 7 on the front and rear surfaces of negative electrode current collector 8 were identical to each other, and matched transition positions 4b between flat portions 2b and inclined portions 2a of positive electrode active materials 2 on the front and rear surfaces of positive electrode current collector 8 in the plane view. That is, all of transition positions 7d between flat portions 7b and inclined portions 7a of negative electrode active materials 7 on the front and rear surfaces of negative electrode current collector 8 and transition positions 4b between flat portions 2b and inclined portions 2a of positive electrode active materials 2 on the front and rear surfaces of positive electrode current collector 3 matched one another in the plane view. Consequently, boundaries 4a between the coated portions and the uncoated portions of positive electrode active materials 3 on the front and rear surfaces of positive electrode current collector 3 were not deviated from each other. The other conditions were identical to those in example 1. Thus, a stacked type battery was obtained.

Comparative Example 1

Each of positive electrode active material 2 and negative electrode active material 7 was formed to be a layer with a uniform thickness and had only a flat portion without an inclined portion. End 4*a* of a coated portion of positive electrode active material 2 and end 40*a* of insulating sheet 40 on the front surface of positive electrode current collector 3 were arranged without being deviated from those on the rear surface, respectively. The other configurations were identical to those in example 1. Thus, a stacked type battery was obtained. The thickness of the stacked type battery was 8.5 mm.

Comparative Example 2

Each of positive electrode active material 2 and negative electrode active material 7 was formed to be a layer with a uniform thickness and had only a flat portion without an inclined portion. End 4*a* of the coated portion coated by positive electrode active material 2 and end 40*a* of insulating sheet 40 on the front surface of positive electrode current collector 3 were arranged without being deviated from those on the rear surface, respectively. The other configurations were identical to those in example 2. Thus, a stacked type battery was obtained. The thickness of the stacked type battery was 3.4 mm.

<Evaluation>

To evaluate the discharge capacities and the cycle characteristics of the stacked type batteries obtained in the above manner, 10 stacked type batteries for each of examples and comparative examples were evaluated. It was confirmed that the discharge capacities and the cycle characteristics of the stacked type batteries in examples 1 to 7 were very stable while the discharge capacities and the cycle characteristics of the batteries in the comparative examples 1 to 2 were less stable than those of the batteries in examples 1 to 7. It is thought that, in a stacked type battery, since the thickness at the position of insulator 40 was prevented from becoming larger than the thickness of the other positions, the stacked type battery was held while uniform pressure was applied and the battery characteristics became stable.

In the present invention, the inclined angle of inclined portion 7*a* of negative electrode active material 7 does not need to be uniform and may be set to an arbitrary angle as long as the capacity of negative electrode 6 is not less than that of corresponding positive electrode 1 taking into account the capacity balance with positive electrode 1.

Figure 17:
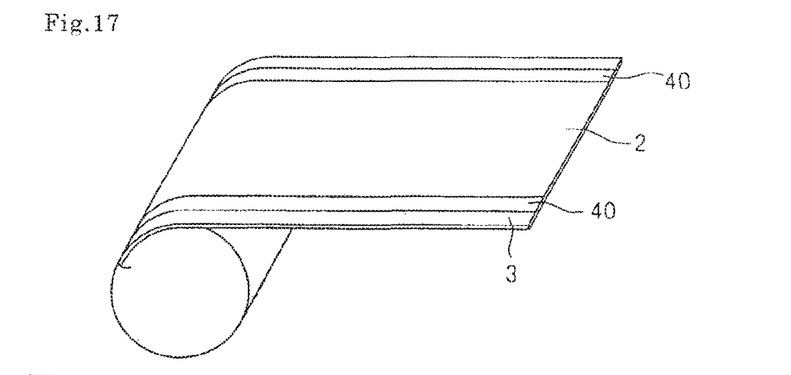
FIG. 17 is a plan view of a step following FIGS. 16a and 16b in the manufacturing method of the secondary battery of the present invention.

In the above examples, positive electrode active material 2 and negative electrode active material 7 were formed by intermittent application (intermittent coating). However, positive electrode active material 2 and negative electrode active material 7 may be formed by continuous application (continuous coating), in which an active material layer without a gap is formed across a plurality of electrode formed portions as illustrated in FIGS. 14 to 16*b*. When an active material is formed by continuous coating, the active material can be stored as an electrode roll as illustrated in FIG. 17 before being cut along cut lines 90 in FIG. 16*a*. In this case, extreme distortion of a portion where insulator 40 is arranged can be reduced. Thus, the quality as an electrode can be improved.

The present invention is useful for manufacturing electrodes of lithium-ion secondary batteries and manufacturing lithium-ion secondary batteries which include the electrodes. The present invention is also useful for being applied to secondary battery other than lithium-ion batteries.

The present application claims priority based on Japanese patent application No. 2013-159372 filed on Jul. 31, 2013, and the disclosure of Japanese patent application No. 2013-159372 is herein incorporated by reference.

REFERENCE NUMERALS

1 Positive electrode
2 Positive electrode active material
2*a*, 7*a* Inclined portion
2*c* Stepped portion
3 Positive electrode current collector
4*a* Boundary
6 Negative electrode
7 Negative electrode active material
8 Negative electrode current collector
20 Separator
40 Insulator
40*a* one end
40*b* other end
100 Secondary battery

The invention claimed is:

1. A secondary battery comprising:
a battery electrode assembly in which a positive electrode and a negative electrode are stacked alternately with a separator interposed therebetween, wherein
each of said positive electrode and said negative electrode comprises a current collector and an active material that is applied on the current collector,
each surface of said current collector comprises a coated portion to which said active material is applied and an uncoated portion to which said active material is not applied,
said active material comprises an inclined portion or stepped portion having a decreasing thickness on at least a part of an outer edge of said coated portion,
insulators are arranged to cover boundaries between said coated portion and said uncoated portion of said positive electrode, and
at least one of said insulators provided on said positive electrode comprises one end which is located on said inclined surface or on said stepped portion of said active material of said positive electrode and which is opposite to said inclined portion or stepped portion of at least one of said active materials formed on each surface of said current collector of said negative electrode, and comprises an other end which is located on said uncoated portion of said positive electrode, and
a combined total thickness of a thickness of one end of a first one of said insulators, a thickness of said active material of said positive electrode at a portion where said one end of said first one of said insulators is located, and a thickness of said active material of said negative electrode at a portion that is opposite to said one end of said first one of said insulators via a separator is less than an other combined total thickness of a thickness of a flat portion of said active material of said positive electrode and a thickness of a flat portion of said active material of said negative electrode.

2. The secondary battery according to claim 1, wherein a transition position between said flat portion and said inclined portion of said negative electrode is opposite to a transition position between said flat portion and said inclined portion of said positive electrode that is opposite to at least one from among said negative electrode with said separator interposed therebetween and said inclined portion of said negative electrode.

3. The secondary battery according to claim 1, wherein a layer thickness of said flat portion of said active material formed on said current collector of said positive electrode is not less than 25 μm and not more than 100 μm, a boundary between said coated portion and said uncoated portion on one surface of the current collector is separated from a boundary between said coated portion and said uncoated portion on the other surface of the current collector by 1.5 mm or more in a plane.

4. A secondary battery comprising: a battery electrode assembly in which a positive electrode and a negative electrode are stacked alternately with a separator interposed therebetween, wherein each of said positive electrode and said negative electrode comprises a current collector and an active material that is applied on the current collector, each of a front surface and a rear surface of said current collector comprises a coated portion to which said active material is applied and an uncoated portion to which said active material is not applied, said active material comprises an inclined portion or stepped portion having a decreasing thickness on at least a part of an outer edge of said coated portion, insulators are arranged to cover boundaries between said coated portion and said uncoated portion of said positive electrode, at least one of said insulators provided on said current collector of said positive electrode comprises one end which is located on said inclined surface or on said stepped portion of said active material of said positive electrode and which is opposite to said inclined portion or stepped portion of at least one of said active materials formed on each surface of said current collector of said negative electrode, and comprises an other end which is located on said uncoated portion of said positive electrode, and a deviation amount in a longitudinal direction of a boundary between said coated portion and said uncoated portion from the front surface to the rear surface of said current collector is five or more times larger than an average thickness of the insulator.

5. The secondary battery according to claim 1, wherein the secondary battery is a lithium-ion secondary battery.

6. The secondary battery according to claim 4, wherein a layer thickness of a flat portion of said active material formed on said current collector of said positive electrode is not less than 25 μm and not more than 100 μm, a boundary between said coated portion and said uncoated portion on one surface of the current collector is separated from a boundary between said coated portion and said uncoated portion on the other surface of the current collector by 1.5 mm or more in a plane.

7. The secondary battery according to claim 4, wherein the secondary battery is a lithium-ion secondary battery.

* * * * *